US012043478B2

(12) United States Patent
Leon

(10) Patent No.: US 12,043,478 B2
(45) Date of Patent: Jul. 23, 2024

(54) WASTE CONTAINER WITH INTEGRATED BAG SEALER

(71) Applicant: Gustavo Leon, Miami, FL (US)

(72) Inventor: Gustavo Leon, Miami, FL (US)

( * ) Notice: Subject to any disclaimer, the term of this patent is extended or adjusted under 35 U.S.C. 154(b) by 0 days.

(21) Appl. No.: 18/132,473

(22) Filed: Apr. 10, 2023

(65) Prior Publication Data

US 2023/0356931 A1 Nov. 9, 2023

Related U.S. Application Data

(60) Provisional application No. 63/339,046, filed on May 6, 2022.

(51) Int. Cl.
*B65F 1/06* (2006.01)

(52) U.S. Cl.
CPC ........ *B65F 1/062* (2013.01); *B65F 2210/126* (2013.01); *B65F 2210/167* (2013.01); *B65F 2210/196* (2013.01)

(58) Field of Classification Search
CPC .... B65F 1/062; B65F 1/00; B65F 1/06; B65F 1/14; B65F 2210/126; B65F 2210/167; B65F 2210/196; B65H 35/008; B65H 35/006; B65H 2701/379; B65B 67/00
See application file for complete search history.

(56) References Cited

U.S. PATENT DOCUMENTS

| | | | | |
|---|---|---|---|---|
| 4,995,770 | A | 2/1991 | Crane | |
| 5,002,451 | A | 3/1991 | Hale et al. | |
| 5,295,345 | A * | 3/1994 | Ter Haar ................ | B65B 67/06 53/136.5 |
| 5,326,421 | A | 7/1994 | Taylor | |
| 5,618,376 | A | 4/1997 | van der Storm | |
| 5,992,128 | A * | 11/1999 | Langerak ................ | B65B 67/06 53/583 |
| 6,263,649 | B1 | 7/2001 | Gross et al. | |
| 6,394,165 | B1 | 5/2002 | Rader | |
| 6,898,925 | B2 | 5/2005 | Smith et al. | |
| 6,971,218 | B1 | 12/2005 | Huckaba et al. | |
| 8,490,813 | B2 * | 7/2013 | Leon ....................... | B65F 1/062 220/495.07 |
| 9,988,168 | B1 * | 6/2018 | Sutter .................. | B65B 51/065 |
| 2002/0096028 | A1 | 7/2002 | Morand | |
| 2004/0129386 | A1 | 7/2004 | Langerak | |
| 2013/0292271 | A1 | 11/2013 | Aarts | |
| 2017/0144789 | A1 * | 5/2017 | Aarts ...................... | B65B 61/20 |

FOREIGN PATENT DOCUMENTS

| | | |
|---|---|---|
| EP | 0561731 | 9/1993 |
| EP | 0833777 | 12/1999 |
| GB | 2520347 | 5/2015 |
| KR | 200288814 | 11/2018 |

* cited by examiner

*Primary Examiner* — Javier A Pagan

(74) *Attorney, Agent, or Firm* — Rafael Perez-Pineiro; The Brickell IP Group, PLLC

(57) ABSTRACT

A container with a moulded bag dispenser and a moulded bag sealer is disclosed. The bag sealer includes a roll of adhesive tape and a rotatable star wheel having a number of radial recesses at equal angular distances for receiving an article to be bound with tape, and a peripheral surface.

10 Claims, 12 Drawing Sheets

WASTE CONTAINER WITH INTEGRATED BAG SEALER

CROSS REFERENCE TO RELATED APPLICATIONS

This application claims the benefit of U.S. Provisional Application No. 63/339,046 filed May 6, 2022, the disclosure of which is hereby incorporated herein by reference in its entirety.

FIELD OF THE DISCLOSURE

The present invention relates generally to the field of waste containment and disposal.

BACKGROUND

There have long been liners in the form of flexible plastic bags for lining waste containers so that waste can be easily removed by removal of the filled liner, while the interior of the container remains reasonably clean. There have been several problems with traditional methods and devices for lining waste containers. For example, boxes of liners were not always at hand and must be found and retrieved; the liners must be pulled out of a separate box, taken to the waste container, inserted and cuffed over the rim; and a significant amount of time and energy was expended in expanding the liner outside of the container and subsequently securing the liner to rim of the container.

Those traditional problems in the art were solved by the waste container and sequential liner deployment method disclosed in U.S. Pat. No. 8,490,813, the contents of which are incorporated herein by reference in their entirety.

Despite the significant advantages provided by the waste container of U.S. Pat. No. 8,490,813, when pulling a bag out of a waste container the person handling the disposal of the bag would either have to tie the plastic bag by hand or by using a twist tie or the like. In light of the foregoing there is a need in the art for tying plastic bags used in the waste container of U.S. Pat. No. 8,490,813 or other waste containers in a semi-automatic manner.

SUMMARY

The following presents a simplified summary of the invention in order to provide a basic understanding of some aspects of the invention. This summary is not an extensive overview of the invention. Rather than specifically identifying key or critical elements of the invention or to delineate the scope of the invention, its purpose, inter alia, is to present some concepts of the invention in a simplified form as a prelude to the more detailed description that is presented later.

A container assembly is disclosed. The container assembly may include a body portion having a front wall, a rear wall, and lateral side walls connecting the front wall and the rear wall. The body portion may be divided by a horizontal partition into an upper waste portion above the partition and a lower portion below the partition.

The assembly also includes an apparatus for binding an article with adhesive tape which includes a housing having a cavity bounded by a housing front wall and a housing rear wall for accommodating a supply of adhesive material. The housing rear wall may be molded and integrated into the front wall of the assembly.

The apparatus also includes means for guiding adhesive material; means for transporting an article at least along and against the adhesive material; a rotatable star wheel having a number of radial recesses disposed at mutually equal angular distances, and a peripheral surface, the star wheel being mounted to the housing between two mutually registered open channels in the housing front wall and housing rear wall, such that an article for binding may be transported from the top to the bottom of the housing through the channels.

The apparatus also includes a tilt member, with the tilt member being located adjacent to the star wheel and extending between the channels, the tilt member having an actuating part movably pivotal about a pivot axis towards and away from the star wheel and also having a spring means for releasably urging the tilt member to a rest position from which the tilt member may be pivoted to an active position.

The apparatus also includes cutting means actuable by a through-fed article engaging the actuating part for cutting the adhesive material as the article is passed through the channels, with the cutting means being affixed to the tilt member and adjacent to the star wheel such that the cutting means is in an extreme cutting position for cutting the adhesive material when the tilt member is pivoted to an active position by a through-fed article engaging the actuating part.

The apparatus also includes stop means configured to limit the displacement of the tilt member such that the cutting means is out of engagement with the peripheral surface of the star wheel when the tilt member is pivoted to an active position, with the stop means comprising a first stopper cam affixed to the tilt member and at least one second stopper cam affixed to the star wheel, such that the first and second stopper cams contact as the tilt member is pivoted to an active position to limit the displacement of the tilt member and cutting means. The adhesive material is guided over the star wheel the said star wheel is positioned such that an article for binding engages in a recess opening of the star wheel, the opening of the recess being situated between the channels such that as the star wheel is rotated, the article is bound with the adhesive material and the actuating part of the tilt member releases the tilt member from a rest position to an active position such that the cutting means engages the adhesive material and the stop means limits the displacements of the cutting means such that the cutting means is out of engagement with the peripheral surface of said star wheel as the adhesive material binds the article.

The apparatus also includes a container partition that divides the container or apparatus into a container waste chamber and a container liner chamber (or article chamber) having a sequential plurality of liners provided within the liner chamber, each liner being linked to the next liner in the sequence, and whereby a first liner in the sequence extends at least partially through the liner passing port to ready the waste container for use. In one embodiment the container partition is molded to the bottom of the apparatus.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

DESCRIPTION

Figure 1:
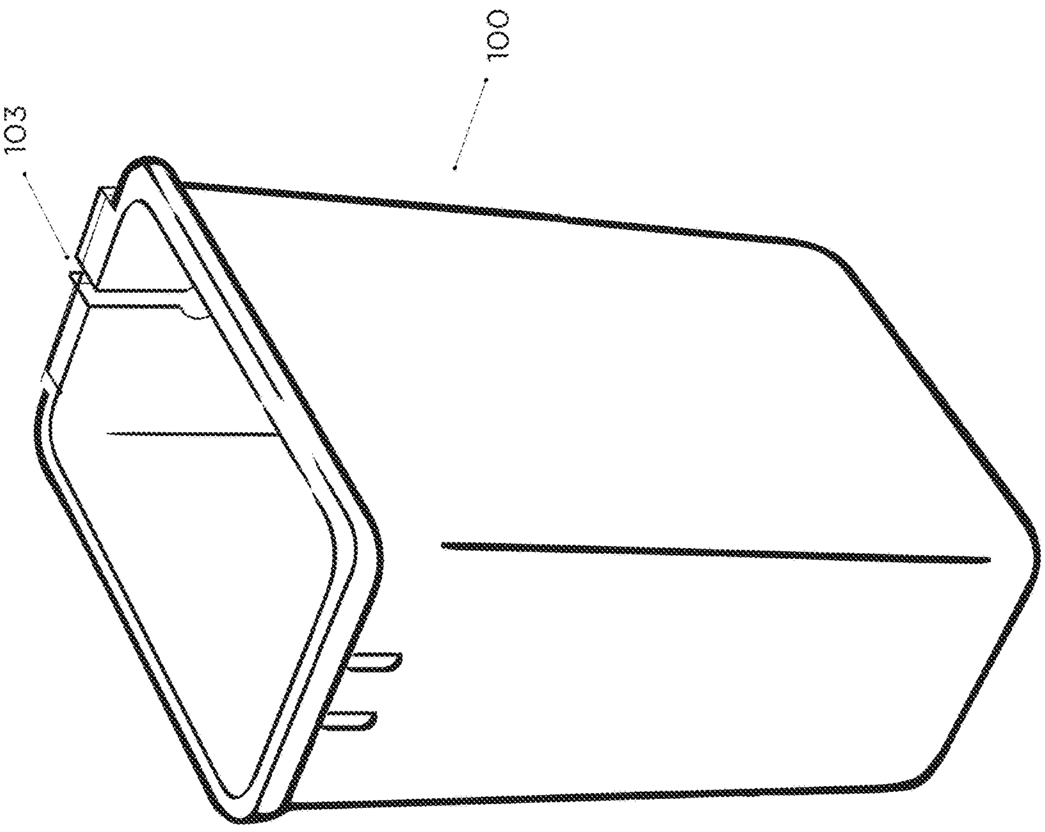
FIG. 1 is a perspective view of a waste container 100 with an integrated bag sealer 103 in accordance with one embodiment.

The foregoing summary, as well as the following detailed description of certain embodiments of the subject matter set forth herein, will be better understood when read in conjunction with the appended drawings. In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that variations may be made without departing from the scope of the subject matter disclosed herein. Furthermore, references to "one embodiment" are not intended to be interpreted as excluding the existence of additional embodiments that also incorporate the recited features. The following detailed description is, therefore, not to be taken in a limiting sense, and the scope of the subject matter disclosed herein is defined by the appended claims and their equivalents.

The waste container of U.S. Pat. No. 8,490,813 (the '813 Patent), the contents of which are incorporated herein by reference in their entirety, may be molded using plastic. In one embodiment, according to the present disclosure the molding of the container in the '813 Patent (or any other container) may be molded by also incorporating into the molding process parts of a modified version of the bag sealer of U.S. Pat. No. 5,525,345 (the '345 Patent), the contents of which are incorporated herein by reference in their entirety. Other bag sealers may also be modified such that at least parts of the bag sealer are integrated with the container in accordance with the teachings of the present disclosure.

In one embodiment in accordance with the present disclosure, the bag sealer of the '345 Patent may be modified so that only one roll of tape is necessary so that the bag sealer of the present invention will be implemented as described herein.

Part of the housing of the bag sealer, for example the rear wall and/or side walls of the bag sealer may be molded with the container in one embodiment of the invention so that they care an integral unit and then the remaining parts of the bag sealer may be plugged in or screwed in to attach to the molded parts of the sealer. Any other means may be utilized to make the bag sealer integrated with the container, such as any attachment means like use of screws, glue, Velcro, etc.

The following describes a sequence of steps that demonstrate how the combined waste container and bag sealer work together.

1. Remove bottom section of the container;
2. Insert Bag through hatch or opening in bottom of container;
3. Secure hatch cover;
4. Arrange bag to receive trash;
5. Tie bag with sealer after bag has been used; and
6. Pull tied bag from inside the container.

FIG. 1 is a perspective view of a waste container 100 with an integrated bag sealer 103 in accordance with one embodiment.

Figure 2:
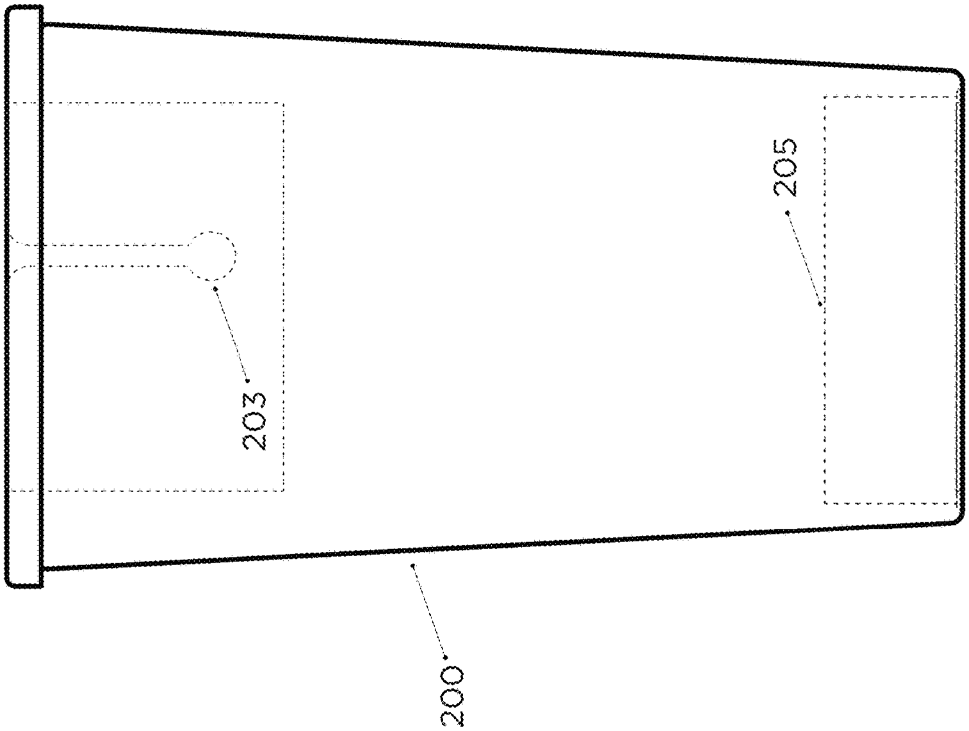
FIG. 2 is a front view of a waste container with an integrated bag sealer and a container partition structure in accordance with one embodiment.

FIG. 2 is a front view of a waste container 200 with an integrated bag sealer 203 and a container partition structure 205 in accordance with one embodiment. The container partition structure 205 may be implemented as the container partition structure disclosed in the '813 Patent. Container partition 205 divides the container 200 into a container waste chamber and a container liner chamber having a sequential plurality of liners provided within the liner chamber, each liner being linked to the next liner in the sequence, and whereby a first liner in the sequence extends at least partially through the liner passing port to ready the waste container 200 for use.

Figure 3:
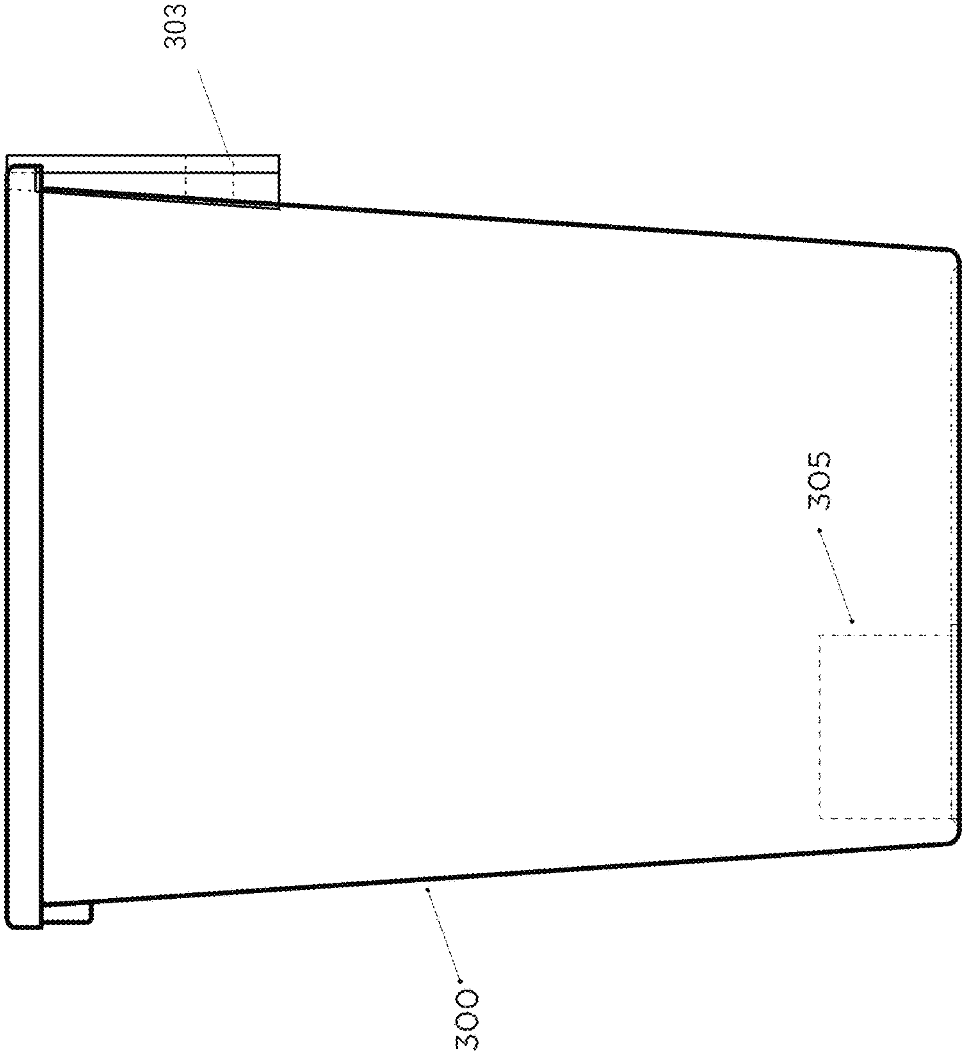
FIG. 3 is a side view of a waste container with an integrated bag sealer and a container partition structure in accordance with one embodiment.

FIG. 3 is a side view of a waste container 300 with an integrated bag sealer 303 and a container partition structure 305 in accordance with one embodiment.

Figure 4:
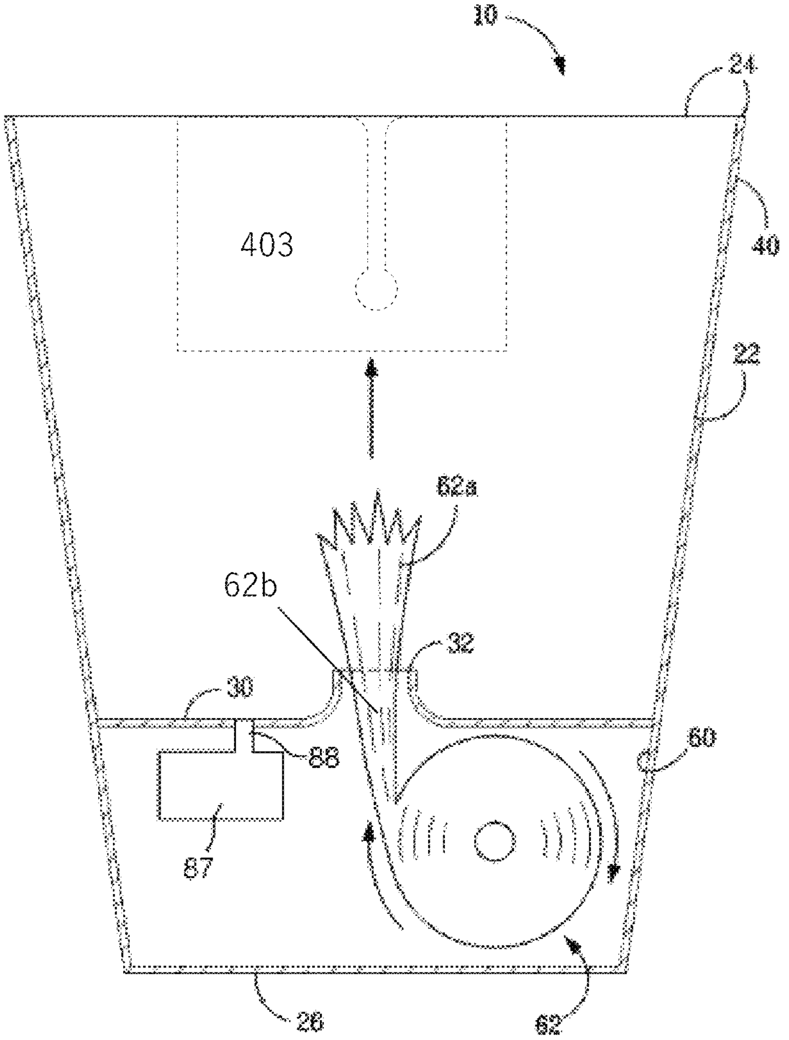
FIG. 4 is a front view of a waste container with an integrated bag sealer and a container partition structure in accordance with one embodiment.

FIG. 4 is a front view of a waste container 10 with an integrated bag sealer 403 and a container partition structure 30 in accordance with one embodiment.

Container partition 30 divides the container 10 into a container waste chamber 40 and a container liner chamber 60 having a sequential plurality of liners 62 provided within the liner chamber 60, each liner 62A being linked to the next liner 62B in the sequence, and whereby a first liner 62A in the sequence extends at least partially through the liner passing port 32 to ready the waste container 10 for use.

To line the waste chamber 10, a liner 62A extending through the liner passing port 32 is pulled into the waste chamber 40 and secured in an open top configuration such as by cuffing the liner's open end over a waste chamber rim 24 at the upper end of one or more of the container walls 22. When the liner 62A is full of waste or other material, the open end of the liner is closed and pulled from the waste chamber 40. Due to the sequential linking of the liners 62, while one liner 62A is pulled out of the waste chamber 10 the open end of a sequentially linked liner 62B is consequently drawn from the liner chamber 60, extends through the liner passing port 32, and extends into the waste chamber 40 for repeated deployment and mounting. In the illustrated embodiment the bag sealer 403 is closed. The bag sealer may be opened in order to replace the adhesive or tape roll supply 5.

Figure 5:
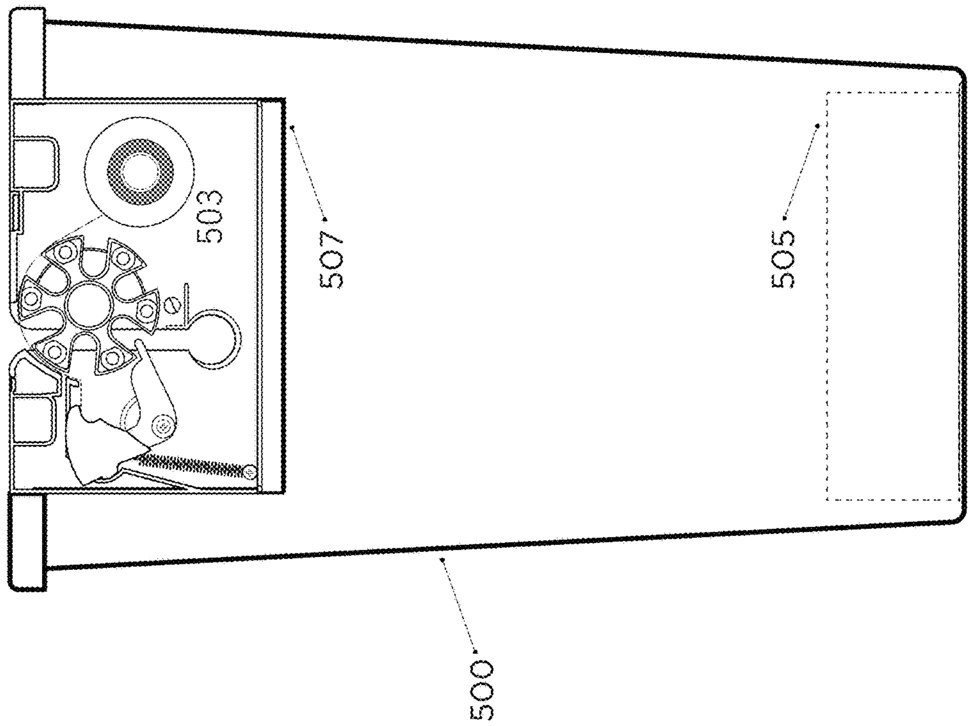
FIG. 5 is a front view of a waste container with an integrated bag sealer and a container partition structure in accordance with one embodiment.

FIG. 5 is a front view of a waste container 500 with an integrated bag sealer 503 and a container partition structure 505 in accordance with one embodiment. In the illustrated embodiment the bag sealer has a lid 507 which has been opened.

Figure 6:
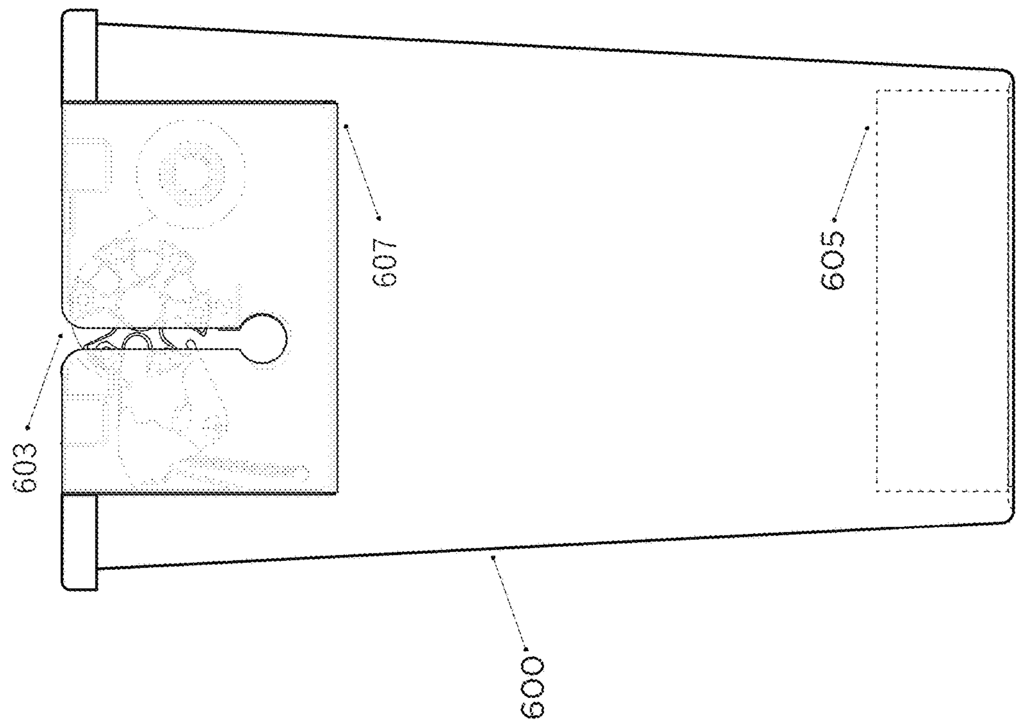
FIG. 6 is a front view of a waste container with an integrated bag sealer and a container partition structure in accordance with one embodiment.

FIG. 6 is a front view of a waste container 600 with an integrated bag sealer 603 and a container partition structure 605 in accordance with one embodiment. In the illustrated embodiment the bag sealer has a lid 607 which has been closed.

Figure 7:
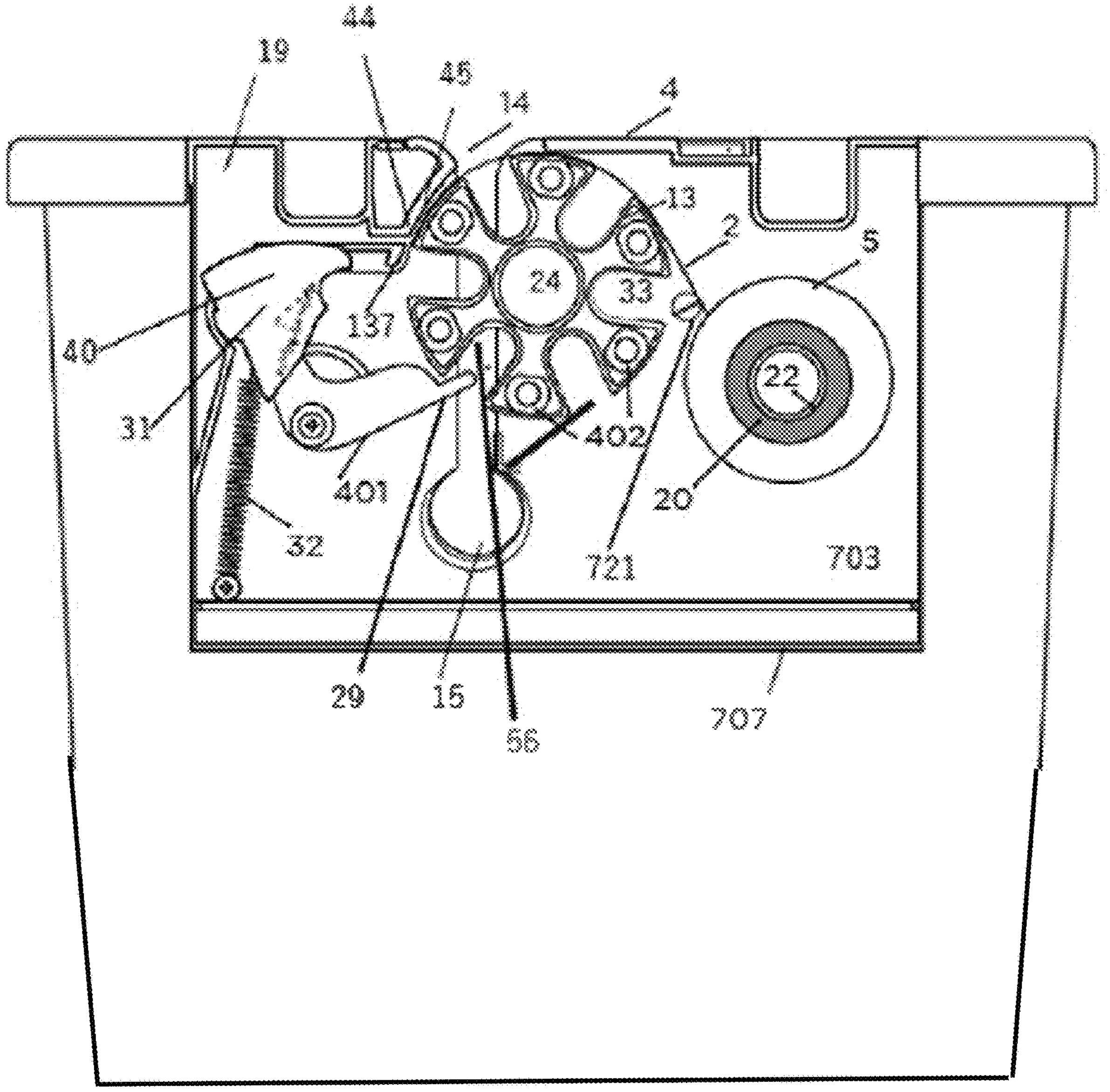
FIG. 7 shows a front view of the interior of the bag sealer in accordance with one embodiment.

FIG. 7 shows a front view of the interior of the bag sealer 703 in accordance with one embodiment. The bag sealer 703 comprises a housing whereof the rear wall 19 is drawn (and which is molded and integrated with the front wall of the container), which rear wall comprises the straight channel 14 which has the widening 15 at the bottom. The adhesive or tape supply roll 5 is carried by the carrier cylinder 20, moulded on the rear wall 19 by injection moulding and whereof a wall portion 22 is embodied as an outwardly resilient lip such that the inside of the supply roll 5 is rotatable with light friction over the carrier cylinders 20 and 22. The lip-shaped wall portion 22 extend in lengthwise direction of the cylinder 20, and has on its outer surface a cam which ensures a small axial locking of the supply roll 5.

The star wheel 13 also accommodated in the housing 4 is carried rotatably by a like carrier cylinder 24, whereby the star wheel 13 is rotatable in housing 4 with small friction. The adhesive tape 2 is fed over the star wheel 13. A carrier cylinder with resilient lip bears a tilt piece 401 whereof an outer end 29 acting as actuating part is located in the region of the channel 14 in the drawn rest position, while extending from the end remote therefrom is a tapering projection serving as knife holder, in which holder is received a cutting knife (the tapering projection and knife are identified with numeral 31 and is also referred herein as cutting knife or knife 31). The tilt piece 401 is loaded by a draw spring 32.

The longitudinal direction of the active leading part of the cutting knife 31 is more or less tangentially oriented relative to the pivot axis defined by the carrier cylinder. In the drawn rest position the draw spring 32 extends roughly tangentially relative to the said pivot axis.

The star wheel 13 has six recesses 33 placed equidistantly in angular direction. The actuating part 29 is loaded by the draw spring 32 such that it exerts a spring pressure on the star wheel 13. As FIG. 7 shows, in the shown angular position a recess is located with its free opening in the region of the channel 14 so that an article can be placed therein to be bound by the bag sealer 703.

As shown in FIG. 7 the adhesive tape 2 is guided with its adhesive side facing upward over the top of star wheel 13. In the above described nip 44 the tape 2 is passed between the guiding 137 and star wheel 13. Situated above the nip 44 is a guide face 45 having the same shape as the peripheral wall of the star wheel 13.

The tilt piece 401 carries a first stopper cam 40 which is situated adjacent the knife holder and extends beyond the active leading surface of the cutting knife 31. The stopper cam 40 has the rounded forward part shown in FIG. 7 and serves for co-action with second stopper cams 402 which are arranged on the star wheel and are situated in this embodiment between the recesses 33.

The tilt piece 401 has on its active extremity 29 a flat contact face which lies roughly perpendicularly of the longitudinal direction of the channels 14. This furthers a positive engagement between an article or bag for binding and the tilt piece.

FIG. 7 also illustrates a pin 721 that is designed to facilitate the tape 2 becoming into contact with the star 13 at a proper angle. Also illustrated is the lid 707 in an open configuration.

In operation, an article or end of a bag is introduced according into the straight channel 14. It is taken up into the recess 33 of star wheel 13 present in that region carrying with it a piece of adhesive tape 2. The star wheel is set into rotation by the article 16 being displaced downward with some force by the user. Thereby formed round the article 16 is a loop of adhesive tape 2 whereof the free ends are carried towards one another with their adhering sides.

The rotation of the star wheel 13 progresses still further and the article thereby comes into force transmitting engagement with the actuating part 29 of tilt piece 401 and sets the latter into pivoting movement, whereby the cutting knife 31 displaces in the direction of the recess 33 of the star wheel 13 then present there, in front of which a the adhesive tape 2 under tensile stress is then situated, which can subsequently be cut through by the cutting knife 31.

The cutting knife 31 is located at a small distance from the bottom surface 56 of the relevant recess 33 whereby the tape laminate has only a small deflection possibility, which aids sharp cutting.

After removing the article from the bag sealer 703, the bag sealer 703 is once again ready for re-use and after rotation through 120° the star wheel 13 is again situated in the same active position as at the beginning of the cycle.

Regarding the functional co-action between the stopper cam 40, which is arranged on the tilt piece 401, and the second stopper cams 402 on the star wheel 13, the stopper cam 40 is out of engagement with the stopper cams 402. In the subsequent phase of a binding operation according to FIG. 7, the actuating part 29 is in force transmitting contact with the article, whereby the tilt piece 401 tilts in the direction perpendicular to the center portion of the peripheral wall of the star wheel 13. The first stopper cam 40 displaces towards the middle of the star wheel 13, wherein the active leading surface of the cam 40 will come into light engagement with one of the relevant cams 402. This ensures a positive positioning of the star wheel 13 such that the cutting knife 31 has exactly the correct position relative to the relevant recess 33.

Figure 8:
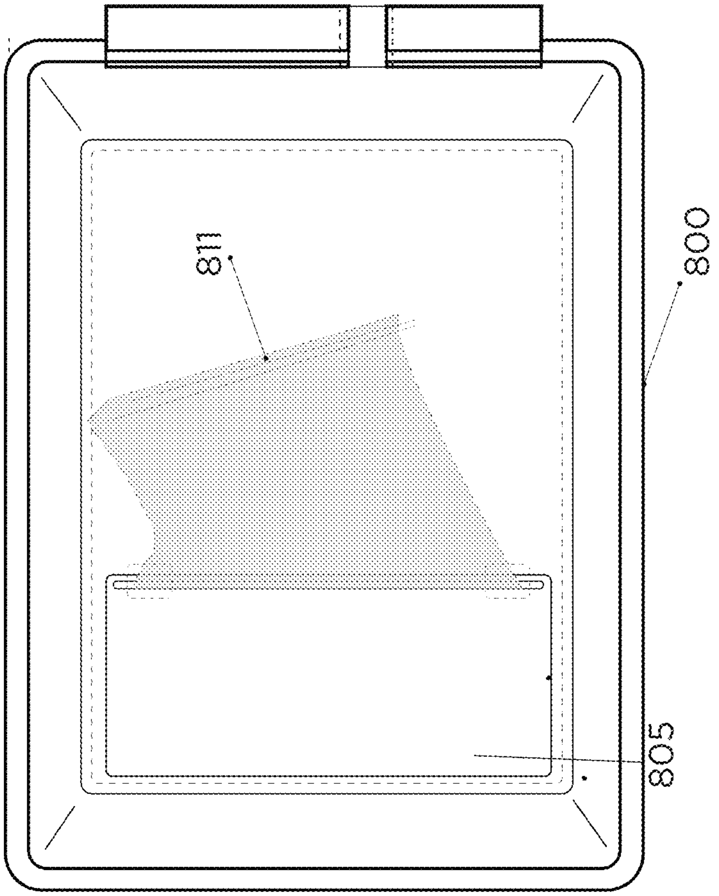
FIG. 8 illustrates a top view of the apparatus or waste container, showing the bag dispenser and bags or articles 811 removed from the dispenser through a slit in accordance with one embodiment.

FIG. 8 illustrates a top view of the apparatus or waste container 800, showing the bag dispenser 805 and bags or articles 811 partly removed from the dispenser through a slit.

Figure 9:
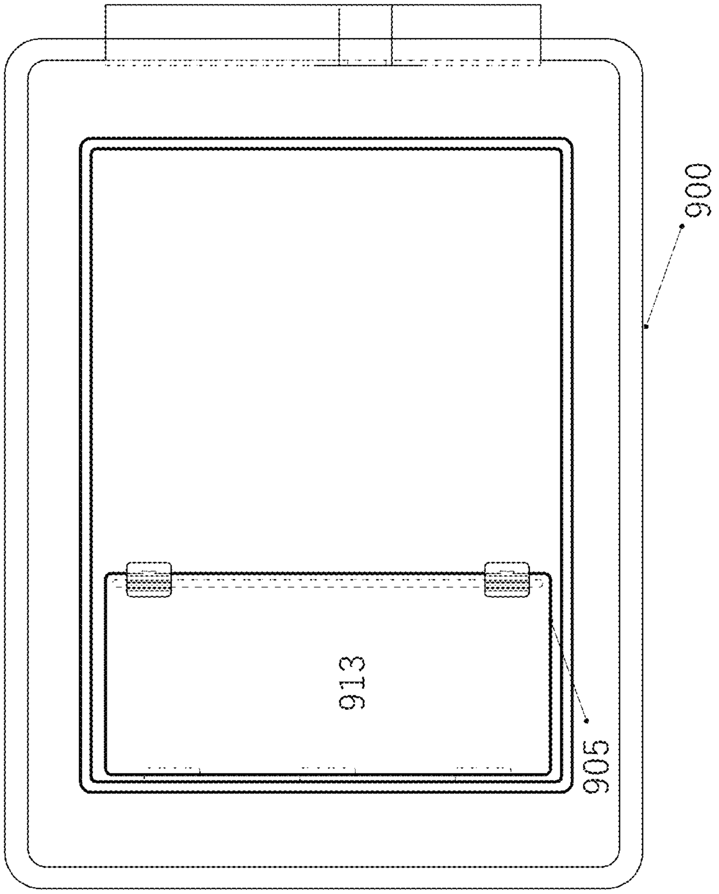
FIG. 9 illustrates a bottom view of the apparatus or waste container, showing the bag dispenser and a lid in a closed configuration in accordance with one embodiment.

FIG. 9 illustrates a bottom view of the apparatus or waste container 900, showing the bag dispenser 905 and a lid 913 in a closed configuration.

Figure 10:
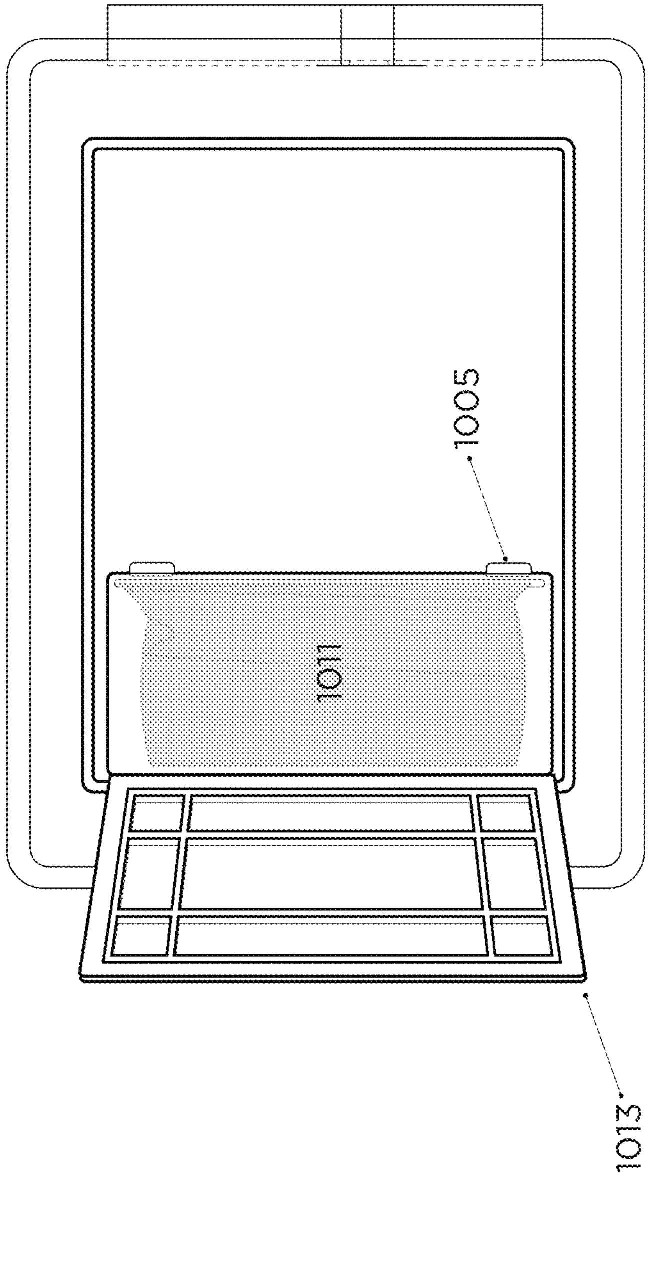
FIG. 10 illustrates a bottom view of the apparatus or waste container, showing the bag dispenser and a lid in an open configuration in accordance with one embodiment.

FIG. 10 illustrates a bottom view of the apparatus or waste container, showing the bag dispenser 1005 and a lid 1013 in an open configuration. The bags 1011 may be inserted by opening the lid 1013 of the bag dispenser 1005 and placing a roll of bags inside the chamber of the dispenser 1005.

Figure 11:
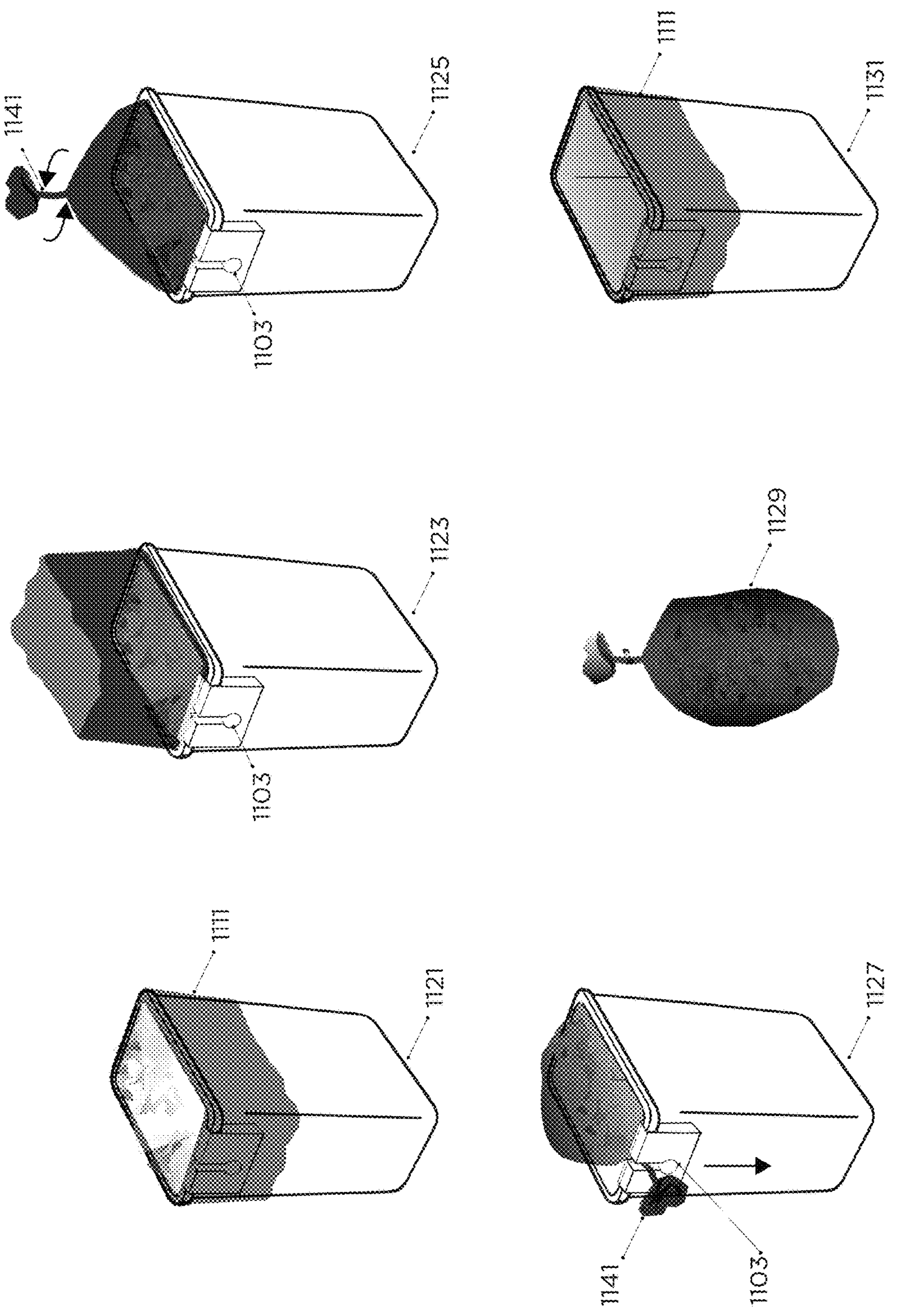
FIG. 11 illustrates the operation of the waste container with integrated bag sealer in accordance with one embodiment.

FIG. 11 illustrates the operation of the waste container with integrated bag sealer in accordance with one embodiment. In step 1121 the bag or article 1111 is full with waste or other material. In step 1123 the bag is partially pulled out of the waste container. In step 1125 the upper section of the bag 1141 is twisted manually and the bag sealer 1103 is ready for use. In step 1127 the upper portion of the bag 1141 is pulled down and through the channel of the bag sealer 1103. In step 1129 the bag has been pulled out of the waste container. In step 1131 a new bag 1111 has been pulled out of the bag dispenser and the bag arranged to receive trash.

Figure 12:
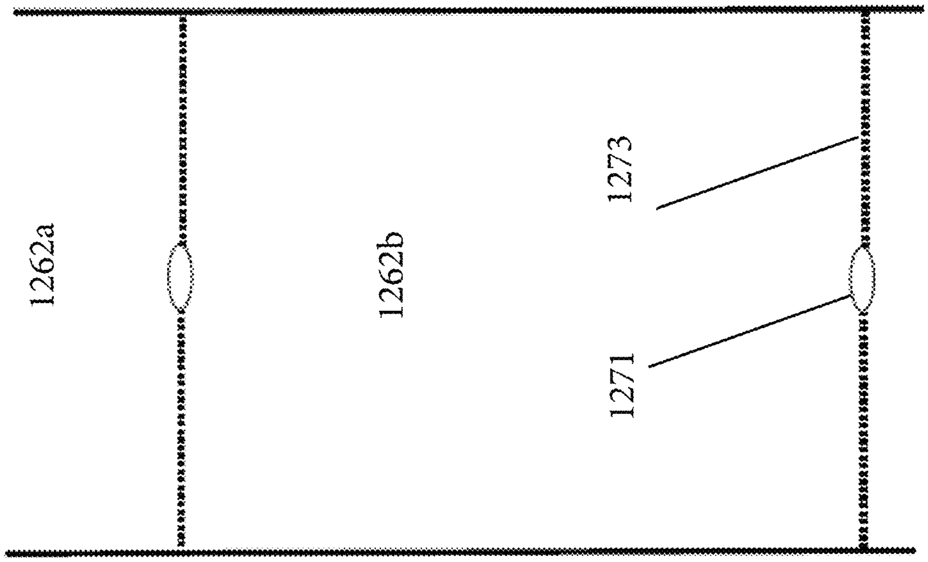
FIG. 12 illustrates a sequential plurality of liners in accordance with one embodiment.

FIG. 12 illustrates a sequential plurality of liners in accordance with one embodiment. The liners 1262A and 1262B are connected one to the next by perforation tear lines 1273. The tear line 1273 is not continuous as an opening 1271 is located at around the center of the tear line 1273. A person removing a bag from the container may insert one or more fingers through the opening 1271 to easily detach liner 1262A from liner 1262B.

The overall configuration of the waste container, bag sealer and sequential liners connected by the perforation tear liners results in an ergonomic system. This means that a person operating the system is able to seal bags and remove them with little effort and causing no stress in the body.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and structures described herein are intended to illustrate the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled.

As used herein, an element or step recited in the singular and proceeded with the word "a" or "an" should be understood as not excluding plural of said elements or steps, unless such exclusion is explicitly stated. Moreover, unless explicitly stated to the contrary, embodiments "comprising" or "having" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. 112(f), unless and until such claim limitations expressly use the phrase "means for" followed by a statement of function void of further structure.

The invention claimed is:

1. A container assembly comprising:

a body portion comprising a front wall, a rear wall, and lateral side walls connecting the front wall and the rear wall;

wherein the body portion is divided by a horizontal partition into an upper waste portion above the partition and a lower portion below the partition;

wherein the front wall has a molded integrated apparatus for binding an article with adhesive tape including a housing having a cavity bounded by a housing front wall and a housing rear wall for accommodating a supply of adhesive material;

means for guiding adhesive material;

means for transporting an article at least along and against said adhesive material;

a rotatable star wheel, said star wheel having a number of radial recesses disposed at mutually equal angular distances, and a peripheral surface, said star wheel mounted to said housing between two mutually registered open channels in the housing front wall and housing rear wall, such that an article for binding may be transported from the top to the bottom of the housing through said channels;

a tilt member, said tilt member located adjacent said star wheel and extending between said channels, said tilt member having an actuating part movably pivotal about a pivot axis towards and away from said star wheel, said tilt member having a spring means for releasably urging said tilt member to a rest position from which the tilt member may be pivoted to an active position;

cutting means actuable by a through-fed article engaging said actuating part for cutting said adhesive material as said article is passed through said channels, said cutting means affixed to said tilt member and adjacent to said star wheel such that said cutting means is in an extreme cutting position for cutting said adhesive material when said tilt member is pivoted to an active position by a through-fed article engaging said actuating part;

stop means configured to limit the displacement of said tilt member such that said cutting means is out of engagement with said peripheral surface of said star wheel when said tilt member is pivoted to an active position, said stop means comprising a first stopper cam affixed to said tilt member and at least one second stopper cam affixed to said star wheel, such that the first and second stopper cams contact as said tilt member is pivoted to an active position to limit the displacement of the tilt member and cutting means;

wherein said adhesive material is guided over the star wheel and said star wheel is positioned such that an article for binding engages in a recess opening of said star wheel, the opening of the recess being situated between the channels such that as the star wheel is rotated, the article is bound with the adhesive material and the actuating part of said tilt member releases the tilt member from a rest position to an active position such that the cutting means engages the adhesive material and said stop means limits the displacements of the cutting means such that the cutting means is out of engagement with said peripheral surface of said star wheel as said adhesive material binds the article.

2. The assembly of claim 1 wherein the first stopper cam has a rounded active cam surface.

3. The assembly of claim 1 wherein the second stopper cam has a rounded active cam surface.

4. The assembly of claim 1 wherein the first stopper cam has a tapered active cam surface.

5. The assembly of claim 1 wherein the second stopper cam has a tapered cam surface.

6. The assembly of claim 1 further comprising a plurality of second stopper cams corresponding to the number of recesses of the star wheel and disposed at mutually angular distances on the star wheel.

7. The assembly of claim 6 wherein said plurality of second stopper cams are situated between said recesses.

8. The assembly of claim 6 wherein the plurality of second stopper cams have rounded active cam surfaces.

9. The assembly of claim 6 wherein the plurality of second stopper cams have tapered cam surfaces.

10. The assembly of claim 1 wherein the first stopper cam extends adjacent to and beyond the cutting means.

* * * * *